E. H. REYNOLDS.
GRAIN DRYING APPARATUS.
APPLICATION FILED JULY 15, 1912.
1,100,397.
Patented June 16, 1914.
2 SHEETS—SHEET 1.
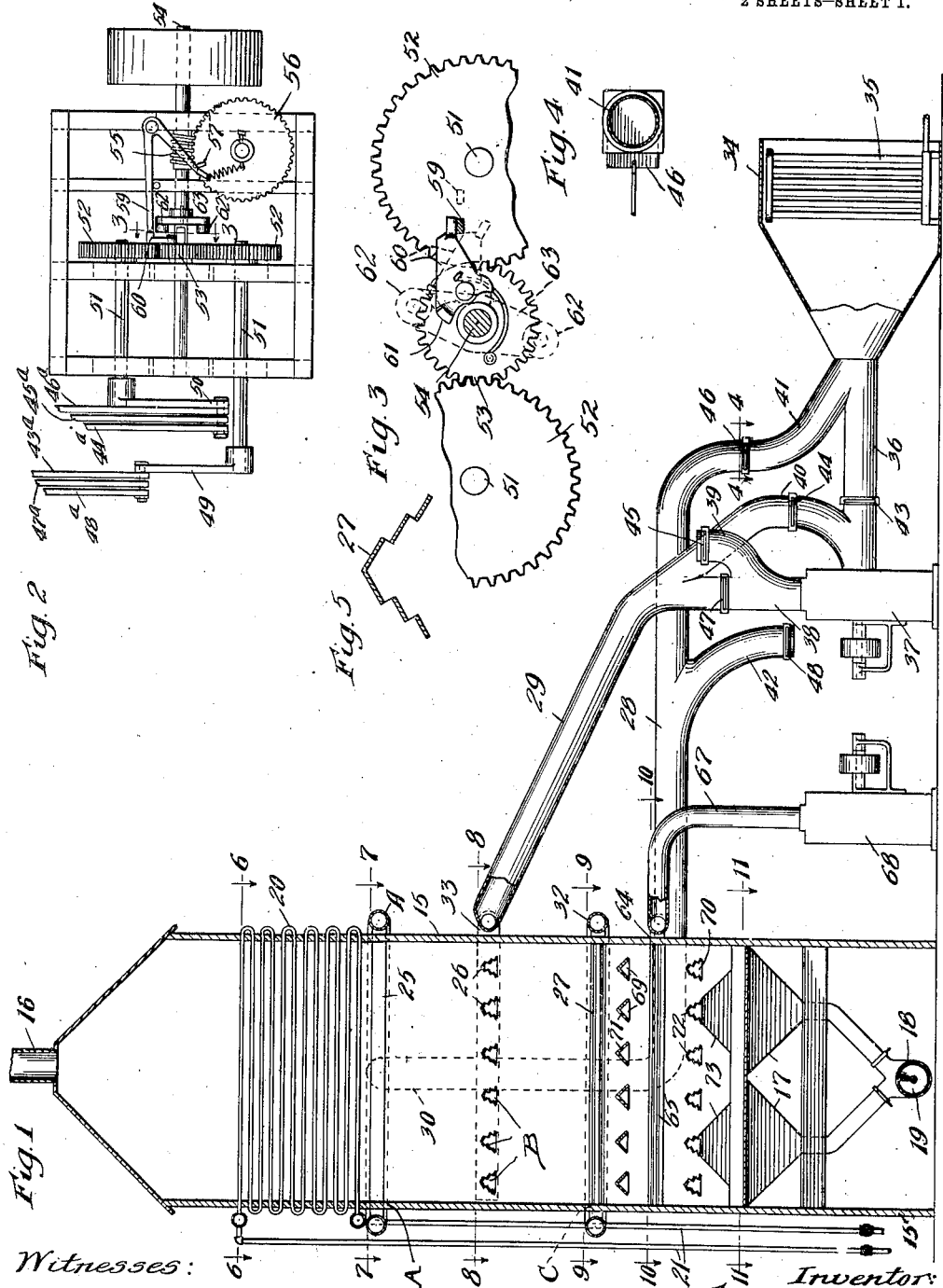
Witnesses:
Wm. Geiger
Pearl Abrams.
Inventor:
Earl H Reynolds
By Munday, Evarts, Adcock & Clarke
his Attys.

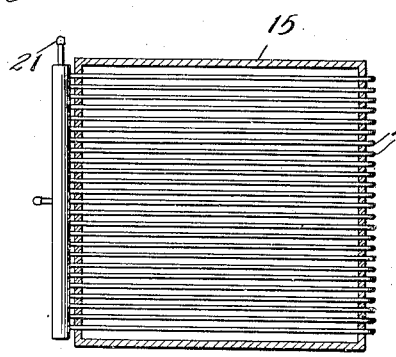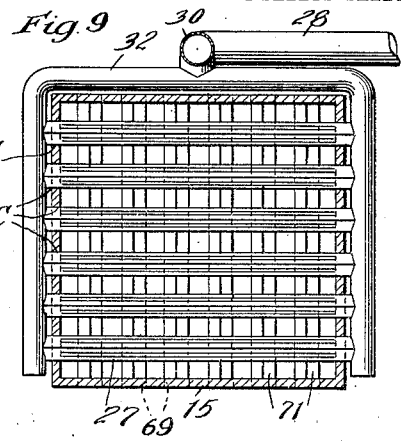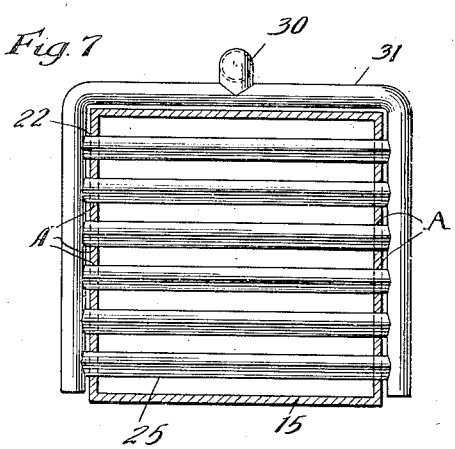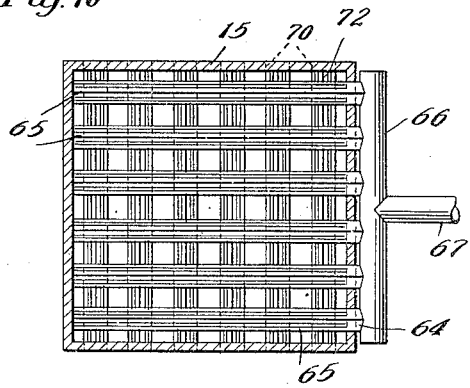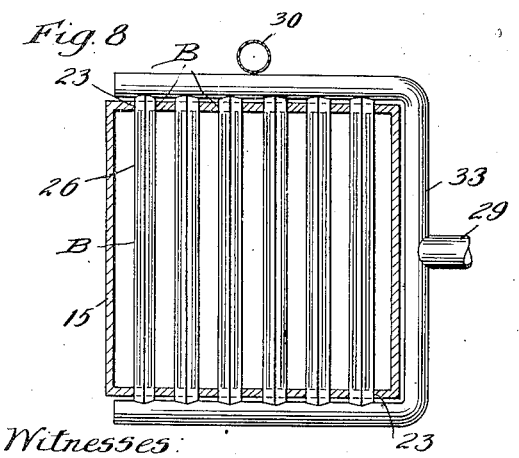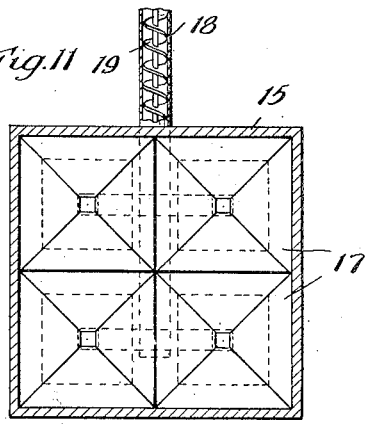

UNITED STATES PATENT OFFICE.

EARL H. REYNOLDS, OF CHICAGO, ILLINOIS.

GRAIN-DRYING APPARATUS.

1,100,397.

Specification of Letters Patent.

Patented June 16, 1914.

Application filed July 15, 1912. Serial No. 709,312.

*To all whom it may concern:*

Be it known that I, EARL H. REYNOLDS, a citizen of the United States, residing in Chicago, in the county of Cook and State of Illinois, have invented a new and useful Improvement in Grain-Drying Apparatus, of which the following is a specification.

This invention relates to improvements in grain drying apparatus.

The invention has for an object the provision of an apparatus which will thoroughly and uniformly remove moisture from oats, barley or other grains, and at the same time permit the grain to be dried in large quantities and at a minimum cost, and to attain these objects I provide for four essential elements of an apparatus for successfully carrying out this purpose, namely, uniform heating of the entire mass of grain, uniform evaporation of the moisture, uniform cooling of the grain and a uniform discharge.

The invention has for another object the provision of suitable devices for reversing, periodically, the direction of flow of the heated air or other gas that carries off the moisture through the mass of grain.

The invention has for further objects such other improvements in the parts and devices and in the novel combinations of parts and devices as herein shown, described or claimed.

In the drawing forming a part of this specification, Figure 1 is a partial, vertical, sectional view of a drier embodying my improvements, and showing the hot air heater, blower and pipe connections. Fig. 2 is a plan view of suitable mechanism adapted to operate the valves for reversing the direction of flow of the heated air to the drier. Fig. 3 is a detail, sectional view of part of the mechanism shown in Fig. 2, and taken on the line 3—3. Fig. 4 is a detail, sectional view of one of the valves, and taken on the line 4—4 of Fig. 1. Fig. 5 is a transverse section, upon an enlarged scale, of one of the ducts used for conducting the air to the interior of the mass of grain, and Figs. 6, 7, 8, 9, 10 and 11 are horizontal, sectional views, taken respectively, on the lines 6—6, 7—7, 8—8, 9—9, 10—10 and 11—11 of Fig. 1.

In the drawing, 15 denotes the columnar grain-reservoir, which, as shown, is provided with a grain inlet 16 at the top through which the grain from the grain elevator is adapted to flow uniformly, preferably continuously, keeping the reservoir filled with a columnar grain-mass that uniformly settles toward and is discharged through a plurality of four sided hoppers 17, communicating with the outlet pipe 18 at the bottom thereof through which the grain passes to the bin or conveyer that is arranged to receive it, and which may be conveyed along the pipe 18 by means of the screw conveyer 19.

A steam heated coil of pipe 20 is disposed within the reservoir near the upper end and adapted to be supplied with steam through the pipes 21, 21. This heating coil, as shown, extends from side to side of the reservoir, and for a considerable distance longitudinally thereof, so that it will thoroughly and uniformly heat the grain-mass as the same settles slowly in the reservoir.

In order to carry off the moisture vapor in the grain-mass as the grain-mass settles below the heating coil, I provide the following means for producing a circulation of heated air or other gas within the grain-mass. The reservoir 15 is provided with three series of orifices A, B and C, each series comprising a plurality of openings 22, 23 and 24, respectively, arranged at different levels in the reservoir and vertically thereof. The orifices of each series are arranged on opposite sides of the reservoir and extending transversely of the reservoir are a plurality of hot air ducts 25, 26 and 27, extending between each pair of the orifices of each series A, B and C, respectively. Hot air is supplied to the reservoir through either of the series of orifices A, B and C from either of the pipes 28 or 29, the former having a vertical portion 30, supplying two U-shaped header pipes 31 and 32, each provided with short branch connections to the orifices of each series A and C, respectively. The pipe 29 also communicates with a U-shaped header pipe 33 extending around three sides of the reservoir and provided with a plurality of short branch pipes leading to each of the orifices of the series B. Heated air is supplied through either of the pipes 28 or 29, and the circulation of the air within the reservoir is first in a direction from the upper and lower series of ducts 25 and 27, through the grain-mass to and out of the intermediate series of ducts 26, and is then reversed so as to flow from the intermediate series of ducts through the grain-mass to the upper and lower series of hot air ducts 25 and 27.

The direction of circulation of the hot air within the reservoir and the grain-mass is reversed and caused to flow alternately in opposite directions preferably about once every five minutes, while the grain-mass is settling slowly through the columnar reservoir. In order to accomplish this reversal of direction of flow of the heated air, I provide the following blower pipe, valve and valve operating mechanism between the reservoir and the intake hood 34 in which the heating device 35 is located. From the hood 34 a pipe connection 36 leads direct to the blower 37, and from the latter issues another pipe connection 38 connected to the pipe 29. The pipe connection 38 is also provided with a branch 39 leading to the atmosphere, and branch pipe connections 40 and 41 are provided, connecting the pipe 29 with the pipe 36 and the pipe 28 with the pipe 36, respectively, and the pipe 28 is provided with an additional branch pipe 42 leading to the atmosphere. Each of the pipe connections and pipe branches is provided with a slide valve, the same being referenced 43, 44, 45, 46, 47 and 48. Each of the slide valves is connected by a link to either of two crank arms 49 or 50, the valves 48, 47 and 43 being connected by the links 48ª, 47ª and 43ª, respectively, to the crank arm 49, and the valves 44, 45 and 46 being connected by links 44ª, 45ª and 46ª, respectively, to the crank arm 50, so that the valves 43, 47 and 48 will be either opened or closed simultaneously and alternately to the opening and closing of the valves 44, 45 and 46. When the valves 44, 45 and 46 are closed and the remaining valves open, the fan blower will draw in air through the pipe connection 36 and force the same up through the branch pipe 38 and pipe 29 to the intermediate series of ducts 26, and into the grain-mass and through the latter to the upper and lower series of ducts 25 and 27, and back through the pipe 28 and out of the branch pipe 42. When the valves 43, 47 and 48 are closed, and the remaining valves open, the fan blower will cause a decrease of pressure in the pipe 29 and branch 40, and thus induce the heated air to flow through the branch pipe 41 and pipe 28 to the upper and lower series of ducts 25 and 27, then through the grain-mass to the intermediate series of ducts and out through the pipe 29, branch pipe 40, through the fan blower and branch pipe 39 to the atmosphere. Each of the crank arms 49 and 50 is mounted on a shaft 51 having a gear 52 at its inner end, said gears 52 meshing with a common driving gear 53 loosely mounted on and adapted to be driven intermittently from a continuously driven shaft 54 by the following clutch mechanism about to be described, said gear 53 being of only half the diameter of each of the gears 52, so that a complete revolution of the gear 53 will cause only half a revolution of each of the gears 52. Keyed to the shaft 54 is a worm 55, meshing with a worm gear 56, the latter being provided with a projecting cam piece 57 adapted to engage and move once in each revolution, one arm 58 of a spring controlled bell crank lever 59, the other arm of which serves as a detent for the spring actuated pawl 60, (see Fig. 3), pivoted on the gear 53 and rotatable therewith, and having a projection 61 thereon movable into the path of rotation of the projections 62 on opposite ends of a lever 63 keyed to the continuously driven shaft 54.

From the foregoing description, it will be seen that once in each complete revolution of the worm gear 56, the pawl 60 will be released and will assume the position shown in dotted line in Fig. 3, and hence the gear 53 will be rotated for a complete revolution by the rotating lever 63, at the completion of which the bell crank lever will be again in position to engage the pawl 60 and release the same from engagement with the projection 62 on the lever 63.

In order to cool the slowly settling columnar grain-mass after the moisture has been carried off by the hot air, cold air is introduced into the mass by means of a series of cold air ducts 64 arranged below the hot air ducts, and extending transversely across the reservoir, and supplied with cold air through a series of orifices D supplied by a plurality of branch pipes 65 from the header pipe 66, connected by pipe 67 to the cold air blower 68. Vent aperturing, to allow the escape of the cold air, is provided in the form of an upper series of vents 69 on opposite sides of the reservoir, and a lower series of vents 70 also provided on opposite sides of the reservoir, the upper series of vents opening into the ends of a series of inverted V-shaped vent ducts 71, and the lower series of vents opening into the ends of the vent ducts 72.

In order to cause the grain to be drawn off through the hoppers 17 from the periphery of the columnar grain-mass and also along intersecting lines, I provide a plurality of pyramidal shaped deflectors 73, one above each hopper 17, so that the grain is prevented from being drawn off from the central portion only of the columnar grain-mass.

As will be noted from the drawing, the upper series of hot air ducts 25 and the upper series of vent ducts 71 are of inverted V shape in cross section, while on the other hand, the remaining series of hot air ducts 26 and 27 and the cold air ducts 64 and vent ducts 72 are not only of inverted V-shape in cross section, but are also slitted on the sides so that the air in passing either from the duct into the grain-mass, or vice versa, follows paths both downwardly and laterally from the ducts. It will also be noted that each series of hot air, cold air and vent ducts are arranged alternately at right angles to each other, so that the grain-mass as it settles slowly through the reservoir and while passing around these ducts, will be stirred and will be completely permeated by the hot air and cold air.

In actual practice, I have found that the most efficient results for ordinarily moist grain are obtained by allowing the grain-mass to settle continuously at a rate requiring approximately forty minutes in passing from the upper series of hot air ducts to the lower series of hot air ducts, which allows the grain-mass to be thoroughly heated while passing through the heating zone, and gives ample time for the moisture to be evaporated or driven off while passing through the drying zone, and allows also sufficient time to thoroughly cool the grain-mass while passing through the cooling zone.

From the foregoing description, it will be seen that means are provided for pre-heating the grain-mass to a temperature approximating the temperature of the heated air or other gas used for evaporating and carrying off the moisture, before the heated air comes in contact with the grain-mass. In this way, the moisture-removing air or gas does not become appreciably cooled when it impinges upon and as it passes through the grain-mass, and substantially all of its heat is retained for evaporating the moisture and retaining it in the vaporized condition until the air or gas has passed out to the atmosphere. Hitherto so far as I am aware, it has been the general practice to use the heated air or other gas for removing the moisture to heat the grain-mass also, but this method has proved inefficient, since the heated air, after evaporating some of the moisture from that portion of the grain-mass with which it first comes in contact, is progressively cooled as it passes through the grain-mass and, due to the condensation which takes place, gives up part of the moisture absorbed at the beginning, to portions of the grain-mass reached last by the heated air.

Although the construction shown and described is so arranged that the grain-mass is heated and dried in the same reservoir, yet it will be obvious to those skilled in the art that the grain-mass may be heated in a chamber separate from that in which the moisture is removed, and still accomplish the same results as with the construction shown and described.

Different grades of grain will, of course, require different lengths of time of treatment, depending upon the amount of moisture present, and where the amount of moisture is comparatively small, the grain-mass may be allowed to settle continuously through the reservoir without reversing the direction of flow of the heated air or other gas, but where the grain contains an excessive amount of moisture, the grain-mass may be held stationary within the columnar reservoir for any period of time found necessary to completely remove the moisture.

I claim:—

1. In a grain drier, in combination: a columnar grain-reservoir having a grain inlet and a grain outlet and adapted to have the grain pass through it in a confined, columnar mass, and having spaced orifices communicating with the interior of the reservoir and each adapted to serve either as a gas inlet or outlet, and means, including connections to said orifices, for producing a circulation of gas between the orifices and through the mass of grain in each of two opposite directions, substantially as specified.

2. In a grain drier, in combination: a columnar grain-reservoir having a grain inlet and a grain outlet and adapted to have the grain pass through it in a confined, columnar mass, and having spaced orifices communicating with the interior of the reservoir and each adapted to serve as either a gas inlet or outlet, and means, including connections to said orifices, for producing a circulation of gas between the orifices and through the mass of grain alternately in opposite directions, substantially as specified.

3. In a grain drier, in combination, a grain-reservoir having a grain inlet and a grain outlet, and adapted to have the grain pass through it in a uniformly settling, confined columnar mass, and having orifices spaced longitudinally of the grain reservoir and communicating with the interior of the reservoir, and each adapted to serve as either a gas inlet or outlet, and means including connections to said orifices, for producing a circulation of gas between the orifices and through the mass of grain in each of two opposite directions.

4. In a grain drier, in combination: a columnar grain-reservoir having a grain inlet and a grain outlet and adapted to have the grain pass through it in a continuously settling and confined columnar mass, and having spaced orifices communicating with the interior of the reservoir and each adapted to serve as either a gas inlet or outlet, and means including connections to said orifices for producing a circulation of gas between the orifices and through the columnar mass of grain, alternately, in opposite directions.

5. In a grain drier, in combination: a grain-reservoir having a grain inlet and a grain outlet and adapted to have grain pass through it in a confined mass, and being also provided with spaced orifices communicating with the interior of the reservoir and each adapted to serve as either a gas inlet or outlet, and heating devices located within the reservoir and adapted to heat the mass of grain and means including connections to said orifices for producing a circulation of gas between the orifices and through the mass of grain in each of two directions.

6. In a grain drier, in combination: a columnar grain-reservoir having a grain inlet and a grain outlet and adapted to have grain pass through it in a uniformly settling, confined columnar mass, and being also provided with spaced orifices communicating with the interior of the reservoir and each adapted to serve as either an inlet or an outlet for a heated gas, said reservoir being furthermore provided with additional orifices adapted to serve as inlets for a cooling gas, and means including connections to said first named orifices for producing a circulation of a heated gas therebetween and through the columnar mass of grain in each of two opposite directions.

7. In a grain drier, in combination: a columnar grain-reservoir having a grain inlet and a grain outlet and adapted to have grain pass through it in a uniformly settling, confined columnar mass, and being also provided with spaced orifices communicating with the interior of the reservoir and each adapted to serve as either an inlet or an outlet for a heated gas, said reservoir being furthermore provided with additional orifices adapted to serve as inlets for a cooling gas, means including connections to said first named orifices for producing a circulation of a heated gas therebetween and through the columnar mass of grain in each of two opposite directions, and said reservoir having vent aperturing for the cooling gas.

8. In a grain drier, in combination: a columnar grain-reservoir having a grain inlet and a grain outlet and adapted to have grain pass through it in a uniformly settling, confined columnar mass, and being also provided with spaced orifices communicating with the interior of the reservoir and each adapted to serve as either an inlet or an outlet for a heated gas, said reservoir being furthermore provided with additional orifices adapted to serve as inlets for a cooling gas, means including connections to said first named orifices for producing a circulation of a heated gas therebetween and through the columnar mass of grain in each of two opposite directions, and said reservoir having vent aperturing for the cooling gas, comprising two series of orifices, one series being located in a plane above and the other series in a plane below, the cooling gas inlets.

9. In a grain drier, in combination: a columnar grain-reservoir having a grain inlet and a grain outlet and adapted to have grain pass through it in a confined columnar mass, a heating device located within the reservoir, said reservoir being provided with spaced orifices communicating with the interior thereof and disposed below the heating device, and each adapted to serve as either an inlet or an outlet for a heated gas, said reservoir being furthermore provided with inlets for a cooling gas, and means, including connections to said first named orifices, for producing a circulation of a heated gas therebetween and through the columnar mass of grain in each of two opposite directions.

10. In a grain drier, in combination: a grain-reservoir having a grain inlet and a grain outlet and adapted to have grain pass through it in a confined mass, said reservoir being provided with three series of orifices spaced from each other longitudinally of the reservoir, all of said orifices being adapted to serve either as hot air inlets or outlets, and means, including connections to said orifices for producing a circulation of hot air from the end series of orifices through the grain mass to the intermediate series of orifices and vice versa.

11. In a grain drier, in combination: a columnar grain-reservoir having a grain inlet and a grain outlet and adapted to have grain pass through it in a uniformly settling, confined columnar mass, said reservoir being provided with three series of orifices spaced vertically of the reservoir, all of said orifices being adapted to serve either as hot air inlets or outlets, and means including connections to all of said orifices for producing a circulation of hot air from the end series of orifices through the columnar grain-mass to the intermediate series of orifices and vice versa, alternately.

12. In a grain drier, in combination: a columnar grain-reservoir having a grain inlet and a grain outlet and adapted to have grain pass through it in a confined mass, and provided also with spaced orifices communicating with the interior of the reservoir; means for supplying a heated gas to the grain-mass through said orifices for evaporating moisture; and means for heating the grain before it comes in contact with said moisture-evaporating gas.

13. In a grain drier, in combination: a columnar grain-reservoir having a grain inlet and a grain outlet and adapted to have the grain pass through it in a uniformly settling, confined columnar mass, said reservoir being provided with spaced orifices communicating with the interior of the reservoir, and each adapted to serve as either a gas inlet or outlet, ducts arranged within the reservoir and adapted to conduct the gas to and from each of said orifices and means, including connections to said orifices, for producing a circulation of gas between the orifices and through the columnar mass of grain in each of two opposite directions.

14. In a grain drier, in combination: a grain-reservoir having a grain inlet and a grain outlet and adapted to have grain pass through it; means for dry-heating the grain; and means for producing a circulation of heated gas through the heated grain-mass while in said reservoir; the zone of action of the first named means being segregated from the zone of action of the second named means.

15. In a grain drier, a columnar grain-reservoir provided with a grain inlet and a grain outlet and adapted to have grain pass through it in a uniformly settling, columnar mass, and having a dry-heating zone, a drying zone and a cooling zone arranged one below the other in the order named, the several zones being segregated in respect to each other.

16. In a grain drier, in combination: a columnar grain-reservoir having a grain inlet and a grain outlet, and adapted to have the grain pass through it in a uniformly settling, confined columnar mass, a dry-heating coil disposed within the reservoir, said reservoir being provided with hot air inlets and outlets, and having also cold air inlets and having vent aperturing for the cold air; the zones of action of said coil and said hot air and said cold air being segregated in respect to each other.

17. In a grain drier, in combination: a columnar grain-reservoir having a grain inlet and a grain outlet, and adapted to have the grain pass through it in a uniformly settling, confined columnar mass, a dry-heating coil disposed within the reservoir, said reservoir being provided with hot air inlets and outlets, and having vent aperturing for the cold air, and a plurality of ducts extending within the reservoir and leading from each of said hot and cold air inlets and to each of the hot air outlets and vent aperturing; the zones of action of said coil and said hot air and said cold air being segregated in respect to each other.

18. In a grain drier, in combination: a columnar grain-reservoir having a grain inlet and a grain outlet and adapted to have the grain pass through it in a uniformly settling, confined columnar mass, said reservoir being provided with two series of orifices spaced longitudinally thereof, said orifices communicating with the interior of the reservoir, and each adapted to serve as either a gas inlet or outlet, ducts extending within the reservoir from each of the orifices, the ducts for the upper series of orifices opening downwardly and the ducts for the lower series of orifices opening both downwardly and laterally, and means, including connections to said orifices, for producing a circulation of gas between the orifices and through the mass of grain in each of two opposite directions.

19. In a grain drier, in combination: a columnar grain-reservoir having a grain inlet and a grain outlet, and adapted to have the grain pass through it in a uniformly settling, confined columnar mass, said reservoir being provided with three series of orifices spaced from each other longitudinally of the reservoir, all of said orifices being adapted to serve either as inlets or outlets for hot air, ducts leading from each of the orifices and extending within the reservoir, the ducts leading to the top series of orifices opening downwardly, and the ducts leading to the intermediate and lowest series of orifices opening both downwardly and laterally, and means, including connections to said orifices, for producing a circulation of hot air from the end series of orifices through the columnar grain-mass to the intermediate series of orifices and vice versa.

20. In a grain drier, in combination: a columnar grain-reservoir having a grain inlet and a grain outlet and adapted to have the grain pass through it in a uniformly settling, confined columnar mass, said reservoir being provided with spaced orifices, each communicating with the interior of the reservoir, and means including connections to said orifices for supplying a gas through the orifices, alternately, to the mass of grain at different levels.

21. In a grain drier, in combination: a columnar grain-reservoir having a grain inlet and a grain outlet and adapted to have the grain pass through it in a confined, columnar mass, and having spaced orifices communicating with the interior of the reservoir and each adapted to serve either as a gas inlet or outlet, and means for producing a circulation of gas between the orifices and through the mass of grain in each of two opposite directions, said means including pipe connections to said orifices, a blower having pipe connections to each of said first named connections, regulating valves and mechanism for operating the valves intermittently.

22. In a grain drier, in combination: a columnar grain-reservoir having a grain inlet and a grain outlet and adapted to have the grain pass through it in a confined, columnar mass, and having spaced orifices communicating with the interior of the reservoir and each adapted to serve either as a gas inlet or outlet, and means, including connections to said orifices, for producing a circulation of gas between the orifices and through the mass of grain in each of two opposite directions, said grain outlet cooperating with a plurality of hoppers, each provided with a pyramidal shaped deflector arranged to cause the grain to be drawn off evenly from all parts of the columnar mass.

23. In a grain drier, in combination: a columnar grain-reservoir having a grain inlet and a grain outlet, and adapted to have the grain pass through it in a uniformly settling, columnar mass, a plurality of series of hot air supply ducts, cold air supply ducts and vent ducts, all extending within the reservoir, each series comprising a plurality of ducts arranged transversely of the reservoir, the ducts of one series being disposed at an angle to the ducts of the next adjacent series.

24. In grain drying apparatus employing heated air to evaporate and remove the moisture, in combination: dry means for pre-heating the grain; and means for causing heated air to come in contact with the heated grain to evaporate and remove moisture; the zone of action of the first named means being segregated from the zone of action of the second named means.

In testimony whereof, I have hereunto set my hand in the presence of two subscribing witnesses.

EARL H. REYNOLDS.

Witnesses:
 PEARL ABRAMS,
 ESTHER ABRAMS.